United States Patent [19]

Lamensdorf et al.

[11] Patent Number: 5,681,475
[45] Date of Patent: Oct. 28, 1997

[54] WATER PURIFICATION COMPOSITION, KIT AND METHOD EMPLOYING THE SAME

[75] Inventors: Marc Lamensdorf, Mt. Sinai; William R. Holub, Port Jefferson, both of N.Y.

[73] Assignee: Truetech, Inc., Riverhead, N.Y.

[21] Appl. No.: 421,229

[22] Filed: Apr. 13, 1995

[51] Int. Cl.$^6$ ................................................ B01D 15/00

[52] U.S. Cl. .................... 210/666; 210/728; 210/667; 210/755; 252/176; 252/180; 252/181; 206/223

[58] Field of Search ................ 206/223; 210/665, 210/667, 723, 732, 754, 755, 728, 666; 252/176, 180, 181

[56] References Cited

FOREIGN PATENT DOCUMENTS 1186967  5/1985  Canada.

OTHER PUBLICATIONS

Biocidal Efficacy of a Flocculating Emergency Water Purification Tablet, by Edmund M. Powers et al., *Applied and Environmental Microbiology*, Jul. 1994, pp. 2316–2323, vol. 60, No. 7.

*Primary Examiner*—Robert J. Popovics
*Attorney, Agent, or Firm*—Galgano & Burke

[57] ABSTRACT

A composition, in unit dosage form, for the batchwise purification for drinking purposes of a relatively small predetermined volume of contaminated water includes: (a) an organo-chlorine compound serving as a disinfectant-sanitizing agent; (b) a solid inorganic metal salt having a trivalent cation serving as a coagulant-precipitate agent; (c) a solid alkali which is highly soluble in water and highly effervescent in the presence of an acid serving as a dispersion-buffer agent; (d) a solid anionic polymeric hydrophilic primary colloid flocculant; (e) a solid cationic, polymeric hydrophilic secondary colloid flocculant; (f) long fiber cellulose serving as an agglomeration matrix and pre-filter for absorbing flocs and trapping visible debris and cysts; and (g) a bulk ion exchange absorbent. A water purification kit and method employing the composition are also disclosed.

22 Claims, No Drawings

WATER PURIFICATION COMPOSITION, KIT AND METHOD EMPLOYING THE SAME

BACKGROUND OF THE INVENTION

1. Field of the Invention

The present invention relates to a novel water purification composition and method employing the same for the batchwise conversion of contaminated surface water into potable drinking water.

2. The Prior Art

Emergency methods for disinfecting water for human consumption have largely been developed for military use. While Chlorine tablets were used by the U.S. Armed Forces during and after World War I, a replacement was sought during the 1940's. Army sponsored civilian research at Harvard University from 1942 to 1945, led to the development of iodine water purification tablets, still in use today. The iodine tablet was issued to the American soldier in 1952 and has become the major emergency water purification technique for military and commercial use.

There are three major problems with iodine tablets: first, recent disinfection guidelines (EPA's "Guide Standard and Protocol for Testing Microbiological Water Purifiers", April 1987) cannot be met by the iodine tablet water purification systems, as currently configured; second, the treated water has an offensive odor and taste also causing resistance to use; and third, they do not clarify the water and there is great hesitancy to drink discolored and turbid natural waters.

During 1988–1990, the Army conducted a market search for a new emergency water purification tablet. Chlorfloc™ (CF), a commercially available product sold by Control Chemical of Alexandria, Va., was identified and evaluated to replace the iodine tablets. (See Canadian Patent No. 1,186,967) These CF tablets combined disinfection with clarification by sedimentation-filtration and the chemical constituents of this disinfection-flocculation tablet are similar to many that have been used by municipal water treatment plants. Unfortunately, studies conducted between 1988 and 1992 indicated that several of the 1987 Guidelines criteria (polio virus reduction, turbidity reduction, etc.) were not met by CF.

SUMMARY OF THE INVENTION

Accordingly, it is an object of the present invention to provide a novel water purification composition and method employing the same for converting contaminated surface water into potable drinking water.

It is also an object of the present invention to provide such a novel composition which, in unit dose form (powder, granular or tablet) with a single addition can purify a specific volume of water.

It is a further object of the invention to provide such a novel composition which simultaneously causes rapid disinfection-sanitization, coagulation, flocculation, buffering, ion exchange absorption, absorption, gel formation, agglomeration, sedimentation and filtration without these simultaneous processes interfering with each other.

It is yet a further object of the present invention to provide such a composition and method specifically intended for field emergency use under circumstances where treated municipal water is not available, such as use by the military, campers/backpackers and use in disaster areas where municipal water has been lost.

It is another object of the present invention to provide such a composition in the form of a tablet with which, in conjunction with a filtering device, would be used for the batch preparation of specific volumes of contaminated water.

It is a more particular object of the present invention to provide a unique system of combining several water purification procedures (i.e., disinfection, coagulation, flocculation, ion exchange, molecular sieving, precipitation, co-absorption and aggregate filtration (clarification) into a single (continuous) process for the purpose of converting contaminated surface water into potable drinking water.

It is a yet more particular object of the present invention to provide such a novel composition and process which would also meet current U.S. E.P.A. 1987 Guidelines for performance.

Certain of the foregoing and related objects are readily obtained in a composition in unit dosage form, for the batchwise purification for drinking purposes of a relatively small pre-determined amount of contaminated water, comprising:

(a) an organo-chlorine compound serving as a disinfectant-sanitizing agent;

(b) a solid, inorganic metal salt having a trivalent cation serving as a coagulant-precipitate agent;

(c) a solid alkali which is highly soluble in water and highly effervescent in the presence of an acid serving as a dispersion-buffer agent;

(d) a solid anionic polymeric hydrophilic primary colloid flocculant which is incompatible with the trivalent cations in solution and when dispersed in water, forms a primary sol which is rapidly precipitated together with the coagulated impurities in the water by the trivalent cations;

(e) a solid cationic, polymeric hydrophilic secondary colloid flocculant, capable when dispersed in the water of forming a secondary sol to assist the primary sol in the aggregation of the coagulated impurities, the proportions of the primary and secondary colloid flocculants in the composition being such that when the composition is used to purify the intended volume of water, the colloids together do not interfere with coagulant dispersal, floc formation, or chlorination of the water;

(f) a long fiber cellulose serving as an agglomeration matrix and pre-filter for absorbing flocs and trapping visible debris and cysts; and (g) a bulk ion exchange absorbent having high absorption of water, a high exchange capacity for cations and rapid absorption of organic and inorganic compounds,
  said components (a)–(g) totaling 100% by weight of said composition.

Certain of the foregoing and related objects are also attained in a water purification kit comprising at least one packaged tablet of the foregoing composition and a filtering device.

In addition, certain of the foregoing objects are also attained in a method for the batchwise purification and clarification for drinking purposes of a relatively small predetermined volume of contaminated water, comprising the steps of:

(a) adding a predetermined effective amount of the above-identified water purification composition, in unit dosage form to said predetermined volume of contaminated water, (b) stirring said water to disperse said composition therein and to flocculate and coagulate suspended solid impurities therein;

(c) allowing said previously stirred water to stand; and (d) thereafter filtering said water through a filtering cloth to remove said impurities and to obtain purified water suitable for human consumption.

DETAILED DESCRIPTION OF THE PREFERRED EMBODIMENT

The water purification tablet of the present invention comprises seven main components:

(1) a disinfectant-sanitizer;
(2) a coagulant precipitant;
(3) a dispersion-buffer agent;
(4) a primary colloidal flocculant;
(5) a secondary colloidal flocculant;
(6) a agglomeration matrix and pre-filter; and
(7) a bulk ion exchange absorbent.

The components of this tablet are detailed below.

1. Disinfectant-Sanitizer

Many suitable halogens can be used as disinfectants, i.e., chlorine, iodine, etc., inorganic chlorines (hypochlorites), organic chlorines (isocyanurates). It is preferable to have a well-documented, rapid dissolving compound. Therefore, sodium dichloro-s-triazinetrione is preferred.

The currently used organo-chlorine compound in stable dry formulations is sodium dichloro-s-triazinetrione (anhydrous or hydrate-$2H_2O$) or sodium dichloro(iso) cyanurate. This compound is an excellent dry source of available chlorine (55–62%) with good storage stability (desiccated), high solubility (26 gms/100 ml water at 25° C.) and 97–100% available hypochlorous acid below pH 6.0. This isocyanurate is somewhat incompatible with certain silicates which are found in the prior art CF formulations (data from isocyanurate manufacturer).

2. Coagulant-Precipitant

Water purification coagulants include several inorganic metal salts (iron, copper and aluminum, as chlorides or sulfates).

Generally, trivalent cationic metal salts, i.e., aluminum sulfate, have been preferred as coagulants for water purification. Aluminum sulfate also has the advantage of providing acidic, which aids in tablet disintegration. It is also very soluble in water and stable as a powder in dry formulations. It does, however, form sulfuric acid at high humidity and this will destroy the organo chlorine compound. This is why the amount should be kept to a minimum (not more than 20%) for adequate coagulation. Tests indicate that compositions containing less than 15% aluminum sulfate produces greater residual turbidity and compositions containing greater than 20% aluminum sulfate increases sulfuric acid formation which damages performance. The prior art composition CF has excessive (30%) aluminum sulfate which impairs its performance, stability, and taste (CF-processed water has an acidic pH of about 4.4). Drinking water pH is most palatable at pH range 6–8, and maximum chlorine release is assured at pH 6.

The amount of aluminum sulfate added as coagulant is critical in relation to the amount of organic hydrophilic primary and secondary colloid. Too high (over 12%) colloids will interfere with coagulant floc-formation and dispersion. Too low (under 5%) colloids will slow gel formation and turbidity removal. Colloids are chosen so that the sol which is formed is the opposite electrical surface charge to the coagulant formed flocs. Typical grades of aluminum sulfate are about 42% water, and this will shorten the stability of the composition. A lower water (29%) content aluminum sulfate is preferable.

3. Dispersion-buffer Agent

A solid alkali with high water solubility and effervescent action in the presence of acid is provided by sodium bicarbonate powder. The amount used should be that determined to give a pH in the final water sample of about 6.0 to 7.5 for optimum chlorine release with minimum residual turbidity. This would be about 15–17% of tablet weight. The 20% in CF interferes with purification functions and consumption tolerances. While there are many bicarbonate/carbonate alkali metals/earth metals which would provide this function, sodium bicarbonate is preferred. Sodium bicarbonate is readily available, is highly soluable in water, produces hydroxyl ions (pH dependent) which promote coagulation, and buffers final product to about 6.0 (which is palatable and allows maximum disinfection action by the organo-chlorine sanitizer).

4. Primary Colloidal Flocculant

Colloids can be induced to congeal, agglomerate and settle by changing ion net charge and concentration. High ion concentration, or the absence of ions, usually causes flocculation, while low ion concentration stabilizes the colloid suspension. A positively charged (cationic) colloid is precipitated by negative ions and a negatively charged (anionic) colloid is precipitated by positively charged ions. It has been observed that trivalent cations provide better flocculation. Since aluminum sulfate is preferred as the coagulant, these trivalent cations will precipitate an anionic polymeric hydrophilic colloid. Primary sol particles then aggregate with flocs to give a rapid increase in floc size and rapid clearing. Many polymeric polyelectrolytes can be used, e.g., polysaccharides (dextrans celluloses), proteins (casein), modified celluloses (hydroxyethyl or hydroxypropyl or carboxymethyl). Such a preferred colloid is sodium carboxymethylcellulose(CMC). It was chosen because it dissolves rapidly in cold water, is suitable for food use, and is physiologically inert. Type 7HOF, from AQUALON, 1313 N. Market Street, Wilmington, Del. 19899, was selected because it: is food grade; has the highest degree of substitution; provides high viscosity; and, provides the best solubility and storage stability in acid media.

For 7HOF, "H" designates higher viscosity and with high substitution ("7"), solutions exhibit a combination of pseudoplastic and thixotropic behavior. This allows for better suspension of solids, entrapment of small suspended particles (in 1–15 u range) like cysts and bacteria. Specific properties of the "O" type include the best solubility and stability in acid media. Tests indicate that while levels of CMC above 12% will induce excessive gel inhibiting tableting and dissolution, levels below 8% leave greater turbidity and gel trap fewer particles (or cysts). Optimum range would be about 8–10%.

5. Secondary Colloidal Flocculant

The addition of a second hydrophilic colloid forms a secondary sol which reacts with the primary sol (CMC) im promoting additional aggregation of flocs. Once again, both colloids should not interfere with coagulant dispersal, flocculation, disinfection, etc. The maximum limit set for this class of high efficiency flocculants used for potable water treatment by the EPA is 1.0 mg/L. This secondary colloid produces a second electrically charged (opposite to the primary sol) dispersed sol. High molecular weight polyelectrolyte, polyacrylamides of various electric charges, charge density and molecular weights, are available. Molecular weight should be one million or more.

Overall, the combination of two oppositely charged colloids and coagulants act to produce a nucleus of floc aggregation center around particles, cysts, bacteria, etc. From these floc aggregate centers, the rapid absorption and growth of these sol-gel-flocs cause rapid clarification of contaminated water. This process also acts synergistically with disinfection to dramatically reduce the microbiologic load of treated water (i.e., bacteria, protozoa, cysts, etc.)

To enhance and accelerate flocculation-agglomeration sedimentation, another very high molecular weight and slightly cationic (to handle the anions) polyacrylamide polymer LT 22S, from ALLIED COLLOIDS, 2301 Wilroy Road, Suffolk, Va. 23434, was used. The hydrophilic colloid forms flocs when dispersed in the water sample. The sol which is formed will be electrically charged opposite to that of the preformed flocs. Both the colloids swell with water to form a secondary sol agglomerating with the original (primary) sol in final rapid aggregation and settling. Neither colloid interferes with coagulant dispersal, chlorination or floc formation.

6. Agglomeration Matrix and Pre-Filter

Cellulose contains many hydroxyl groups causing hydrogen bonding between fiber chains. When fully swollen in water, they possess a high surface area for adsorption and absorption. The desired particle size range or fiber length is about 125–400 u. Cellulose of this particle size is considered "long fibrous cellulose" (available from WHATMAN, Springfield Mill, Maidstone, Kent, ME14 2LE, England).

In order to gather the macromolecular flocs together and to further adsorb contaminants from the water sample, long fibrous cellulose was added to the formula. The long fibrous cellulose adsorbs the flocs to rapidly form a rapid settling "mat" of organic matter. It acts to trap visible debris and bacteria, protozoa and cysts prior to the cloth filtration. Tests indicate that amounts of cellulose above 25–30% delay floc formation, while levels below 15% delay aggregate settling and clarification times. Thus, 20% was chosen as optimum.

7. Bulk Ion Exchange Adsorbent.

Historically, certain aluminum silicates of alkali and alkaline earth elements extract ions, elements and compounds from solutions. Some zeolites, as these aluminum silicates are called, include: Clinoptilolite, Chabazite, Analcime, Erionite and Mordenite. Zeolites have been applied to water and sewage treatment for removal of polyvalent cations and ammonium. Suitable zeolites for this invention include potassium zeolite such as that sold under the trademark KOROLITE K (KAOPOLITE INC., Union, N.J. 07083), Cabsorb and Chabazite (GSA RESOURCES, INC., Cortavo, Ariz. 85652).

The largest percentage (32%) of the tablet weight should be comprised of a compound or compounds which provide high absorption of water, high exchange capacity for cations and rapid adsorption of organic and inorganic compounds. Many of these compounds (e.g., Kaolins, bentonites, silicas, zeolites) have been used in municipal water purification processes. One such compound is the natural zeolite, Clinoptilolite (Potassium Aluminosilicate), which has a porous, cage-like molecular structure giving it unique and selective water purification uses. Cabsorb and Chabazite (GSA RESOURCES, INC., Cortavo, Ariz. 85652) and KOROLITE K (KAOPOLITE INC., Union, N.J. 07083), can effectively absorb the following from solution: ammonia, amines and various organic compounds, including pesticides and related toxic chemical agents; cesium, strontium and other radioactive and non-radioactive minerals; lead, cadmium, silver and other heavy metals. Zeolite will also co-adsorb flocs and aid in the rapid clarification of the water sample (acting as an additional secondary colloid) prior to final filtration. The zeolite also acts as a swelling agent to aid in dissolution of the tablet and as a dessicant in tablet storage.

The compostion of the present invention may include the above-described constituents in the following general and preferred percentage ranges based upon the total weight of the composition:

| Component No. | General Range | Preferred Range |
| --- | --- | --- |
| 1 | about 2.5% | 2.5% |
| 2 | 10–20% | 15–19% |
| 3 | 10–14 20% | 15–17% |
| 4 | 5–12% | 5–10% |
| 5 | about 0.17% | 0.17% |
| 6 | 15–25% | 18–20% |
| 7 | 20–35% | 30–32% |

The preferred formulation of the present invention components compared to that of the prior art compound CF is illustrated in Table A below:

TABLE A

Formula differences between present invention and CHLORFLOC ™ (CF)

| | PERCENT BY WEIGHT | |
| --- | --- | --- |
| FORMULA COMPONENT | PRESENT INVENTION | PRIOR ART CHLORFLOC |
| 1. Sodium Dichloroisocyanurate | 2.50 | 2.50 |
| 2. Aluminum sulfate | 19.00 | 30.00 |
| 3. Sodium Bicarbonate | 16.67 | 20.00 |
| 4. Carboxymethylcellulose | 10.00 | 2.00 |
| 5. Cationic polyacrylamide LT22S | 0.17 | 0.00 |
| Nonionic polyacrylamide LT 20 | 0.00 | 0.15 |
| 6. Long Fibrous Cellulose | 20.00 | 0.00 |
| Silicates (Syloid) | 0.00 | 2.00 |
| Bentonite-clay | 0.00 | 40.00 |
| 7. Cabsorb or Chabazite, KOROLITE K | 31.67 | 0.00 |

In contrast to the present invention requirement of less than 20% of weight by aluminum sulfate, the excessive aluminum sulfate (30%) in CF causes low final pH (about 4.4), decreases storage stability, increases sulfuric acid production and interferes with performance. In addition, the lack of long fibrous cellulose in CF results in decreased contaminant adsorption and increased turbidity of the final sample which interferes with the rate of flocculation-agglomeration- sedimentation. Furthermore, the inadequate amount of CMC (2%) in CF, slows floc formation and cyst adsorption. The non-ionic polyacrylamide LT20, present in CF (but not in the present invention) interferes with floc formation, because it is non-ionic and has a low molecular weight. Moreover, the amount of bentonite in CF is too high, contributing to increased turbidity and delayed clarification in the final sample.

The constituents in the above-identified example of the present invention in Table A were mixed mechanically to obtain a homogeneous blend. Tablets were formed using a conventional tableting machine in 600 mg. dosages.

The tablet of the present invention was tested against the Prior Art compound CF by treating one liter of an artificial, EPA-approved, contaminated water sample with the addition of two tablets according to the present invention and that sold under the trademark CHLORFLOC in the formulation identified in Table A. In the case of the present invention two 600 milligram tablets were added to one liter of water of the contaminated water sample at a temperature of 5° C. The samples were carefully stirred for one minute, then allowed to stand for four minutes. The samples were then swirled or shaken for 10 seconds and allow to stand 15 more minutes. The water sample was then filtered through a cloth, i.e., Polyester/cotton duck #252305, weight approximately 5.7 oz. per square yard, thread count: warp approx. 88, Fill approx. 32, 64–69% polyester, 31–36% cotton, tensile-grab method: warp 135 lbs. min., Fill 115 lbs. min., Elmendorf Tearing: warp 8000, Fill 9000 (HOLLISTON, P.O. Box 478, Kingsport, Tenn. 37662). The same procedure was followed for CHLORFLOC.

After filtration of treated water, the pH was tested with a standard pH meter. After the tablets were added, and while mixing, disintegration time was noted by stopwatch. After four minutes of standing (when much of the flocculate settles), there should be a visibly heavy precipitate at the bottom of the container plus the supernatant should be mostly clear. Turbidity of final filtrate was measured by a modified Turner fluorometer against known Nephelometric Turbidity Unit (NTU) standards. The bacterial log reduction was done by spiking test water samples with known concentrations of Klebsiella Terrigena (a representative *E.Coli* water contaminant) at levels of $10^7/100$ ml or above. After treatment, a minimum of $10^6$ or 6 log reduction equaling 99.9999% bacterial elimination was noted. Bacterial estimates are performed by standard methods ("Standard Methods for the Examination of Water and Waste Water, 20th Edition, 1993, APHA). Removal of 4.2 micron particles was used as an alternate to using Giardia cysts. Counting particle concentration before and after treatment provides the log or percent removal. EPA requires a 3 log reduction starting at $10^7$ particles per liter (or higher) which would equal 99.9% removal. Virus removal was done by using spiked test water samples with Poliovirus type 1 (LSC)-ATCC-VR-59 and Rotavirus (SA-11)-ATCC-VR-899 at $10^7$/L or higher. Methods are described in "Methods in Environmental Virology, 1982, Smith and Gerba, pp. 15–47. A 4 log reduction minimum would provide 99.99% virus removal.

The performance results of the present invention in comparison to that of the prior art compound CF and as both are measured against the current EPA goals is set forth in Table B below:

TABLE B

Performance differences between Present Invention and CF and EPA Test Water #2

| CHARACTERISTICS | REQUIRE-MENTS OR GOALS | PRESENT INVEN-TION | CHLORFLOC |
|---|---|---|---|
| 1. pH of post-treated water | 5–6 | 5.8 | 4.4 |
| 2. Tablet disintegration time in seconds | 10 | 10 | 30–90 |
| 3. 4 minute supernatant | clear | clear | very cloudy |
| 4. 4 minute precipitate | heavy | heavy | light |
| *5. Turbidity - final NTU EPA Test water #2 | ≦5 | 4 | 10 |
| *6. Bacterial log reduction | ≧6 log | 11 log | 6 log |
| *7. Giardia or Latex (cyst simulation) reduction | ≧3 log | 5 log | 3*log |
| *8. Viral (polio + rota) reduction | ≧4 log | 4 log | 1–2 log |

*EPA requirements (1987 Assessment Guidelines)
*Giardia Cysts

As can be seen from the above Table B, the tablet of the present invention meets or exceeds every goal criteria, whereas CF meets some of the present EPA standards.

Typically, tablets according to the invention will be packed in packages of synthetic plastic material preferably trilaminate packaging and then sealed under very low humidity conditions to keep them dry. The amount of this composition to be added will be determined by estimating water temperature, degree of solid contamination, and intended use of the purified water. Generally, water will be treated on a batch base system, e.g., a bottle, drum, tank or reservoir water by adding an appropriate mass of tablets thereto to cause flocculation and if desired, sterilization for consumption. After clarification, the water may be left for a sufficient time while treated to remove any objectional smell or taste, e.g., residual excess chlorine removal or with activated carbon and may be decanted and then filtered to remove floating flocs of sediment via the use of a cloth filter such as the Hollistan 252305 poly/cotton duck cloth filter sold by HOLLISTON, P.O. Box 478, Kingsport, Tenn. 37662).

Each 600 mg tablet of the present invention can clarify and disinfect one liter of suspected polluted water. The following is the procedure to be followed:

1. One or two 600 milligram tablet(s) to one liter (1.1 quarts) of water according to the table below:

TABLE C

| Temperature of Water | Number of Tablets | Waiting Period After Step 5 |
|---|---|---|
| 41° F. (5° C.) | 2 | 15 minutes |
| 50° F. (10° C.) | 1 | 15 minutes |
| 59° F. (15° C.) | 1 | 15 minutes |
| 77° F. (25° C.) | 1 | 7 minutes |

2. Swirl and/or shake for one minute until tablet(s) are completely disintegrated. Allow all gas to escape.
3. Set aside for four minutes opened to the air.
4. Swirl and/or shake for ten seconds. Wait seven minutes, at temperature of 77° F. (25° C.) or above, or fifteen minutes at colder temperatures as specified in Table C above. Keep open to the air during waiting period. Pour off clear top layer into double layer of the cotton duck cloth. Collect filtrate in a clean container. If treated water cannot be seen while pouring off, then slowly pour off top layer until sediment is seen, then stop. If the filtered water is still cloudy, add a half tablet more and repeat steps 2–5. The clarified water is now ready for drinking. It is important to note that one should discard sediment between uses, rinse the cloth thoroughly with treated water, and always use same side of the cloth as top side for straining.

While only several embodiments and examples of the present invention have been described, it will be obvious to those skilled in the art that many modifications may be made to the invention without departing from the spirit and scope of the invention.

What is claimed is:

1. A composition, in unit dosage form, for the batchwise purification for drinking purposes of a relatively small predetermined volume of contaminated water comprising:
   (a) an organo-chlorine compound serving as a disinfectant-sanitizing agent;
   (b) a solid inorganic metal salt having a trivalent cation serving as a coagulant-precipitate agent;
   (c) a solid alkali which is highly soluble in water and highly effervescent in the presence of an acid serving as a dispersion-buffer agent;
   (d) a solid anionic polymeric hydrophilic primary colloid flocculant which is incompatible with the trivalent cations in solution and when dispersed in water, forms a primary sol which is rapidly precipitated together with the coagulated impurities in the water by the trivalent cations;

(e) a solid cationic, polymeric hydrophilic secondary colloid flocculant, capable when dispersed in the water of forming a secondary sol to assist the primary sol in the aggregation of the coagulated impurities, the proportions of the primary and secondary colloid flocculants in the composition being such that when the composition is used to purify the intended volume of water, the colloids together do not interfere with coagulant dispersal, chlorination of or floc formation in the water;

(f) a long fiber cellulose serving as an agglomeration matrix and pre-filter for absorbing flocs and trapping debris and cysts; and (g) a bulk ion exchange absorbent having high absorption of water, a high exchange capacity for cations and rapid absorption of organic and inorganic compounds;
said components (a)–(g) totaling 100% by weight of said composition.

2. The composition according to claim 1, wherein said composition is in the form of a tablet.

3. The composition according to claim 1, wherein said organo-chlorine compound is sodium dichloro-s-triazinetrione or sodium dichloroisocyanurate, and a combination thereof.

4. The composition according to claim 3, wherein said organo-chloride compound is present in an amount of about 2.5% by weight of said total compound.

5. The composition according to claim 1, wherein said inorganic metal salt is aluminum sulfate.

6. The composition according to claim 5, wherein said aluminum sulfate is present in an amount of up to 20% by weight of said total composition.

7. The composition according to claim 1, wherein said solid alkali is sodium bicarbonate.

8. The composition according to claim 7, wherein said sodium bicarbonate is present in an amount of less than 17% by weight of the total composition.

9. The composition according to claim 1, wherein said primary colloid flocculant is sodium carboxymethylcellulose.

10. The composition according to claim 9, wherein said primary colloid flocculant is present in an amount of at least 10% by weight of the total composition.

11. The composition according to claim 1, wherein said second colloid flocculant is a high molecular weight polyacrylamide polymer.

12. The composition according to claim 11, wherein said secondary colloid flocculant is present in an amount up to 0.17% by weight of the total composition.

13. The composition according to claim 1, wherein said bulk ion exchange absorbant is a zeolite.

14. The composition according to claim 1, wherein said zeolite is present in an amount of up to 35% by weight of the total composition.

15. The composition according to claim 1, wherein said long fibrous cellulose is present in an amount of at least 20% by weight of the total composition.

16. The composition of claim 1, wherein said elements (b)–(g) are present in the following percentage amounts based upon the total weight of said composition: (b) 10–20%; (c) 10–20%; (d) 5–12%; (e) about 0.17%; (f) 15–25%; and (g) 20–35%.

17. The composition of claim 1, wherein said elements (a)–(g) are present in the following percentage amounts based upon the total weight of said composition: (a) about 2.5%; (b) 15–19%; (c) 15–17%; (d) 5–10%; (e) 0.17%; (f) 18–20%; and (g) 30–32%.

18. The composition according to claim 2, wherein said tablet is 600 mg.

19. A water purification kit comprising a package of at least one 600 mg water purification tablet of the following composition:

(a) an organo-chlorine compound serving as a disinfectant-sanitizing agent;

(b) a solid inorganic metal salt having a trivalent cation serving as a coagulant-precipitate agent;

(c) a solid alkali which is highly soluble in water and highly effervescent in the presence of an acid serving as a dispersion-buffer agent.

(d) a solid anionic polymeric hydrophilic primary colloid flocculant which is incompatible with the trivalent cations in solution and when dispersed in water, forms a primary sol which is rapidly precipitated together with the coagulated impurities in the water by the trivalent cations;

(e) a solid cationic, polymeric hydrophilic secondary colloid flocculant, capable when dispersed in the water of forming a secondary sol to assist the primary sol in the aggregation of the coagulated impurities, the proportions of the primary and secondary colloid flocculants in the composition being such that when the composition is used to purify the intended volume of water, the colloids together do not interfere with coagulant dispersal, chlorination of or floc formation in the water;

(f) a long fiber cellulose serving as an agglomeration matrix and pre-filter for absorbing flocs and trapping debris and cysts;

(g) a bulk ion exchange absorbent having high absorption of water, a high exchange capacity for cations and rapid absorption of organic and inorganic compounds, said components (a)–(g) totaling 100% by weight of said composition; and (h) a cloth filter.

20. A method for the batchwise purification and clarification for drinking purposes of a relatively small predetermined volume of contaminated water, comprising the steps of:

(a) adding a predetermined effective amount of a water purification composition, in unit dosage form to said predetermined volume of contaminated water, said composition including:

(i) an organo-chlorine compound serving as a disinfectant-sanitizing agent;

(ii) a solid inorganic metal salt having a trivalent cation serving as a coagulant-precipitate agent;

(iii) a solid alkali which is highly soluble in water and highly effervescent in the presence of an acid serving as a dispersion-buffer agent;

(iv) a solid anionic polymeric hydrophilic primary colloid flocculant which is incompatible with the trivalent cations in solution and when dispersed in water, forms a primary sol which is rapidly precipitated together with the coagulated impurities in the water by the trivalent cations;

(v) a solid cationic, polymeric hydrophilic secondary colloid flocculant, capable when dispersed in the water of forming a secondary sol to assist the primary sol in the aggregation of the coagulated impurities, the proportions of the primary and secondary colloid flocculants in the composition being such that when the composition is used to purify the intended volume of water, the colloids together do not interfere with coagulant dispersal, chlorination of or floc formation in the water;

(vi) a long fiber cellulose serving as an agglomeration matrix and pre-filter for absorbing flocs and trapping debris and cysts; and (vii) a bulk ion exchange absorbent having high absorption of water, a high exchange capacity for cations and rapid absorption of organic and inorganic compounds;

said components (a)–(g) totaling 100% by weight of said composition.

(b) stirring said water to disperse said composition therein and to flocculate and coagulate suspended solid impurities therein;

(c) allowing said previously stirred water to stand; and (d) thereafter filtering said water through a filtering cloth to remove said impurities and to obtain purified water suitable for human consumption.

21. The method of claim 18, wherein the predetermined volume of water is one liter, and the water purification composition is in the form of a 600 mg tablet.

22. The method of claim 19, wherein said step (b) has a duration of four minutes and step (c) has a duration of seven to fifteen minutes.

* * * * *